(12) United States Patent
Jung et al.

(10) Patent No.: US 9,565,450 B2
(45) Date of Patent: Feb. 7, 2017

(54) METHOD AND DEVICE FOR PROCESSING VIDEO SIGNAL

(71) Applicant: LG ELECTRONICS INC., Seoul (KR)

(72) Inventors: Jiwook Jung, Seoul (KR); Sehoon Yea, Seoul (KR); Moonmo Koo, Seoul (KR); Jin Heo, Seoul (KR); Taesup Kim, Seoul (KR); Jaewon Sung, Seoul (KR); Eunyong Son, Seoul (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 14/383,386

(22) PCT Filed: Mar. 7, 2013

(86) PCT No.: PCT/KR2013/001858
§ 371 (c)(1),
(2) Date: Sep. 5, 2014

(87) PCT Pub. No.: WO2013/133648
PCT Pub. Date: Sep. 12, 2013

(65) Prior Publication Data
US 2015/0043636 A1    Feb. 12, 2015

Related U.S. Application Data

(60) Provisional application No. 61/608,072, filed on Mar. 7, 2012, provisional application No. 61/637,801, filed on Apr. 24, 2012.

(51) Int. Cl.
*H04N 7/12*    (2006.01)
*H04N 11/02*    (2006.01)
(Continued)

(52) U.S. Cl.
CPC ........... *H04N 19/597* (2014.11); *G06T 3/0093* (2013.01); *H04N 19/463* (2014.11);
(Continued)

(58) Field of Classification Search
CPC ............................. H04N 7/50; H04N 7/26244
See application file for complete search history.

(56) References Cited

U.S. PATENT DOCUMENTS

2006/0120620 A1    6/2006    Bassi et al.
2011/0058021 A1*   3/2011    Chen ..................... G06T 15/205
                                                                  348/46

FOREIGN PATENT DOCUMENTS

KR    10-2009-0050783 A    5/2009
KR    10-2010-0039356 A    4/2010
KR    10-2011-0136014 A    12/2011

* cited by examiner

*Primary Examiner* — Chikaodili E Anyikire
(74) *Attorney, Agent, or Firm* — Dentons US LLP

(57) ABSTRACT

The present invention encodes a warp map by using a video codec such as a multi-view texture image by a warp converter, and decodes a warp map by using a video codec such as a multi-view texture image by using a warp inverter. The present invention may incur less additional costs because it does not use a dedicated warp map coder. In addition, the present invention may convert a warp map by using a warp map converter and send the converted map to an encoder and invert decoded warp map information by using a warp map inverter so that the warp map is encoded and decoded by using a video codec such as a multi-view texture image. In addition, it is possible to increase compatibility by enabling various kinds of supplementary data to be used. In addition, it is possible to increase technique compatibility by simply applying a warp map scheme to a 3D video coding technique using a depth map.

8 Claims, 11 Drawing Sheets

(51) Int. Cl.
*H04N 11/04* (2006.01)
*H04N 19/597* (2014.01)
*G06T 3/00* (2006.01)
*H04N 19/463* (2014.01)
*H04N 19/537* (2014.01)
*H04N 19/51* (2014.01)
*H04N 19/59* (2014.01)
*H04N 19/124* (2014.01)

(52) U.S. Cl.
CPC ........... *H04N 19/51* (2014.11); *H04N 19/537* (2014.11); *H04N 19/59* (2014.11); *H04N 19/124* (2014.11)

METHOD AND DEVICE FOR PROCESSING VIDEO SIGNAL

This application is a National Stage Application of International Patent Application No. PCT/KR 2013/001858, filed on Mar. 7, 2013, and claims the benefit of U.S. Provisional Patent Application Nos. 61/608,072, filed on Mar. 7, 2012 and 61/637,801, filed on Apr. 24, 2012, in the United States Patent and Trademark Office, all of which are incorporated herein by reference in their entirety.

TECHNICAL FIELD

The present invention relates to a method and device for processing a video signal.

BACKGROUND ART

Compression refers to a signal processing technique for transmitting digital information through a communication line or storing digital information in a form suitable for a storage medium. Compression targets include audio, video, text, etc. Particularly, a technique for compressing images is referred to as video compression. Multiview video has characteristics of spatial redundancy, temporal redundancy and inter-view redundancy.

DISCLOSURE

Technical Problem

An object of the present invention is to improve video signal coding efficiency.

Technical Solution

The present invention encodes a warp map through the same video codec used for a multiview texture image by using a warp converter.

The present invention decodes the warp map through the same video codec used for the multiview texture image by using a warp reconverter.

The present invention obtains the warp map from first depth information extracted from the multiview texture image and second depth information obtained from a weighted sum using the first depth information.

Advantageous Effects

The present invention does not use a dedicated warp map coder and thus incurs less additional costs. Furthermore, a warp map can be encoded and decoded using the same video codec used for a multiview texture image by converting the warp map using a warp map converter, sending the converted warp map to an encoder and reconverting decoded warp map information using a warp map reconverter. In addition, it is possible to increase compatibility by enabling various kinds of supplementary data to be used.

Moreover, it is possible to improve technical compatibility by simply applying the method using the warp map to 3D video coding using a depth map.

BEST MODE

To accomplish the objects of the present invention, there is provided a video encoding apparatus, including: a warp calculator for generating a warp map from a multiview texture image; a warp converter for converting the warp map into a warp residual; and a multiview video encoder for encoding the multiview texture image and the warp residual.

The warp converter may further include a linear predictor for generating a predicted value using the width of the multiview text image and the width of the warp map and generating the warp residual using the warp map and the predicted value.

The warp residual may include at least one of a maximum value, a minimum value and residual precision, wherein the warp converter further comprises a residual quantizer for converting the warp residual into an integer using at least one of the maximum value, minimum value and residual precision.

According to the present invention, a video decoding apparatus includes: a multiview video decoder for receiving a bitstream including a warp residual and a multiview texture image; a warp reconverter for reconstructing a warp map using the warp residual; and an image domain warper for generating a multiview video using the multiview texture image and the warp map.

The warp reconverter may further include a linear compensator for generating a predicted value using the width of the multiview text image and the width of the warp map and reconstructing the warp map using the warp residual and the predicted value.

The warp residual may include at least one of a maximum value, a minimum value and residual precision, wherein the warp reconverter further comprises a residual dequantizer for dequantizing the warp residual using at least one of the maximum value, minimum value and residual precision.

The maximum value and the minimum value may be obtained from a slice header.

The maximum value and the minimum value may be obtained from a sequence.

The residual precision may be obtained using a floating maximum value and a floating minimum value.

MODE FOR INVENTION

A technique for encoding or decoding multiview video signal data considers spatial redundancy, temporal redundancy and inter-view redundancy. In the case of multiview video, techniques under standardization need to code a multiview texture image captured at two or more view points and a multiview depth image or a warp map corresponding to the multiview texture image in order to generate a 3D image. In the specification, coding may include both encoding and decoding and may be flexibly interpreted in the technical spirit and technical scope of the present invention.

In 3D video coding, supplementary data is transmitted along with multiview video. The supplementary data is used to synthesize an intermediate view image of transmitted multiview video at a receiver. As a method for synthesizing the intermediate view image at the receiver, a method using depth data and a method using image warping through a warp map are suggested.

Figure 1:
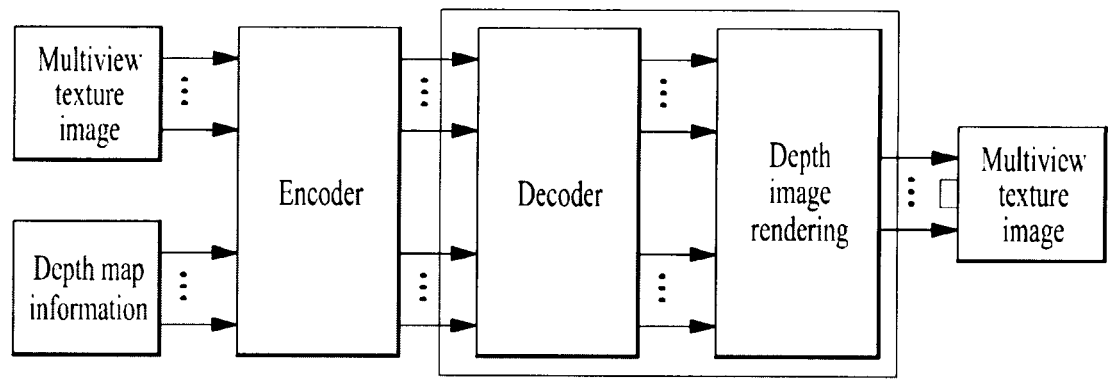
FIG. 1 illustrates configurations of an encoding apparatus and a decoding apparatus using a depth map according to an embodiment to which the present invention is applied.

FIG. 1 illustrates configurations of an encoding apparatus and a decoding apparatus using a depth map according to an embodiment to which the present invention is applied.

To implement 3D video, intermediate view image synthesis for synthesizing a virtual intermediate view image present between viewpoints using images of multiple viewpoints is needed. A depth image is necessary to generate an intermediate view image at a desired position of a viewer. Depth refers to a disparity difference caused by a viewpoint difference in an image sequence captured by a plurality of cameras. A method using a depth map generates an image of a new viewpoint by estimating composition of space with reference to depth image information. When the depth image information is insufficient, distortion that may be generated is prevented using various methods. However, a method using a warp map is currently suggested in addition to the method using the depth map.

Figure 2:
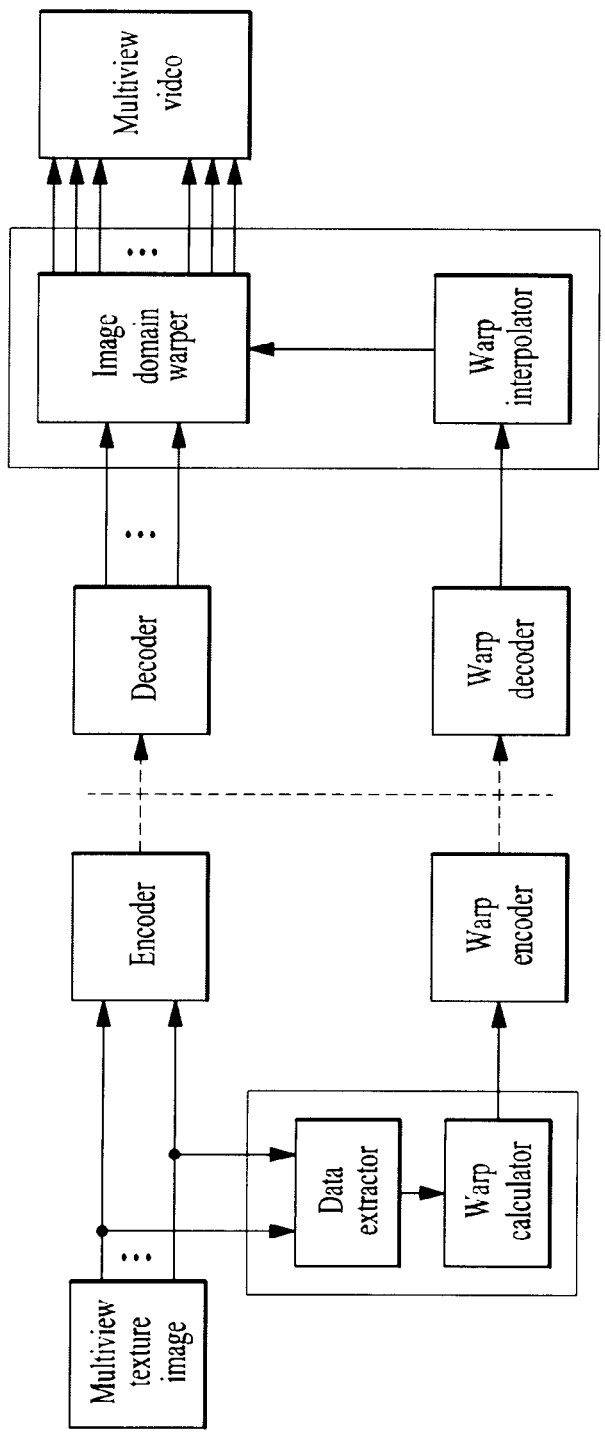
FIG. 2 illustrates configurations of an encoding apparatus and a decoding apparatus using a warp map according to an embodiment to which the present invention is applied.

FIG. 2 illustrates configurations of an encoding apparatus and a decoding apparatus using a warp map according to an embodiment to which the present invention is applied.

A multiview texture image is encoded by an encoder. A data extractor extracts data for generating a warp map from the multiview texture image and sends the data for generating the warp map to a warp calculator. The warp calculator generates the warp map using the data received from the data extractor. A warp encoder encodes the warp map generated by the warp calculator separately from the multiview texture image. A bitstream of the multiview texture image encoded by the encoder and a bitstream of the warp map encoded by the warp encoder may be separately transmitted.

A decoder decodes the bitstream of the multiview texture image to extract information for prediction of the multiview texture image and reconstructs the multiview texture image. A warp decoder decodes the bitstream of the warp map to extract information for prediction of the warp map and reconstructs the warp map. An image domain warper may synthesize an intermediate image using the reconstructed multiview texture image and warp map to reconstruct multiview video.

In the method using a warp map, a warp map including pixel shift information is used when an image of a new viewpoint is generated. A multiview texture image is encoded and decoded using a multiview video encoder and decoder. The warp map is generated from the multiview texture image and encoded and decoded using a dedicated encoder and decoder. The multiview texture image and the warp map, which are decoded through different paths, are used to synthesize an intermediate view image.

The method using a warp map has the advantage that an image of a new viewpoint can be effectively generated even when a depth image is not present. However, additional costs are needed since the dedicated encoder and decoder are used.

The warp map indicates shift information on each pixel, that is, new coordinate information and represents the new coordinate information by multiple quads. One quad corresponds to a region representative of a plurality of neighboring pixels. The warp map can be obtained through the following procedure with reference to a given multiview texture image.

1) Depth information is extracted to estimate shift information on each pixel. The shift information may include a degree by which the corresponding pixel is shifted from the original position thereof to a position corresponding to a synthesized view.

2) Saliency map information that represents saliency of each pixel is estimated. Distortion of an image of a previous viewpoint is minimized in a pixel region having high saliency. Saliency represents a degree of markedness due to a large brightness or color difference or distinct contour in an image and can be calculated by combining edge information or depth information. A region with high saliency is less distorted. When the region with high saliency is distorted, there is a large difference between the original form of the region and the distorted form. A front region of an image may be regarded as a salient region through depth information.

3) Finally, a region in which a vertical edge is present is extracted in order to minimize distortion in the region having the vertical edge. The vertical edge represents a vertical component of a foreground or background in an image. For example, the vertical edge refers to a vertical region such as a pillar or a human leg. In synthesis of an image of a specific viewpoint, vertical components may be distorted when pixels are shifted to the left and right.

On the basis of information obtained through the aforementioned three stages, shift of quads constituting the warp map can be optimized to generate the warp map.

While the warp map can be generated in both the encoder and the decoder, a method for generating the warp map in the encoder, compressing and transmitting the warp map may be considered in order to reduce decoder complexity.

Figure 3A:
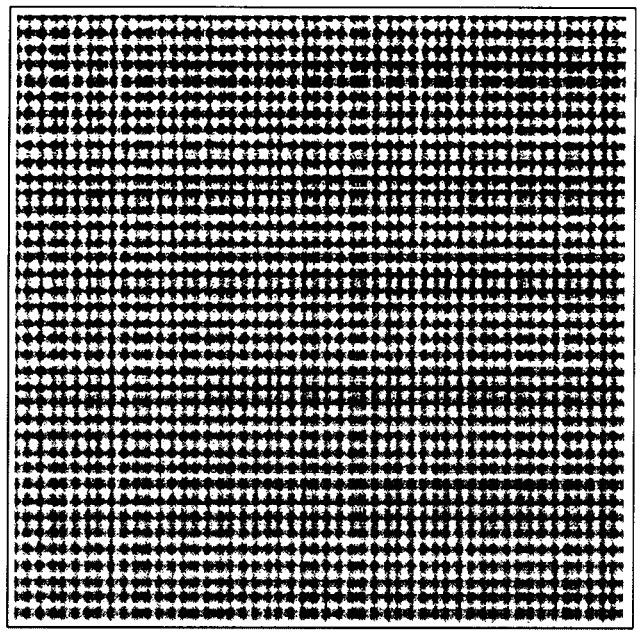
FIGS. 3A and 3B illustrate images for explaining a warping method using a warp map according to an embodiment to which the present invention is applied.
Figure 3B:
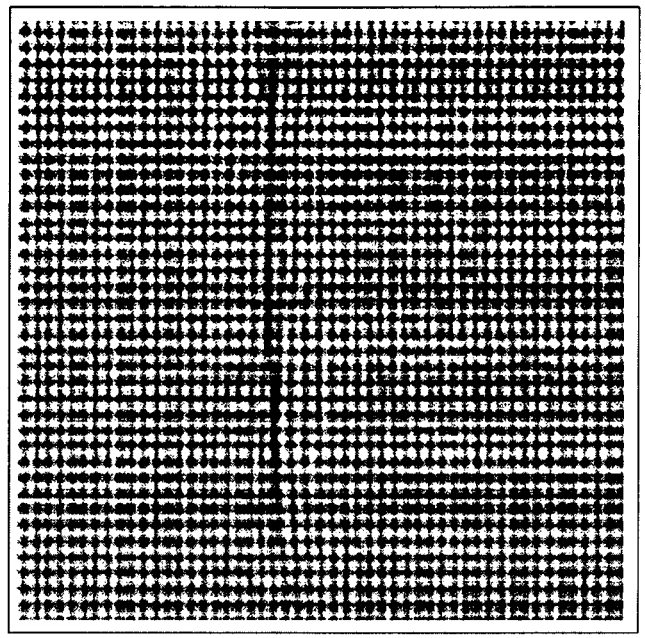

FIGS. 3A and 3B illustrate images for explaining a warping method using a warp map according to an embodiment to which the present invention is applied.

The warping method using a warp map is as follows. For example, when images of two viewpoints are decoded and then an intermediate view image is synthesized from the image of the left viewpoint, if a pixel composed of grid points arranged at a predetermined interval in horizontal and vertical directions, as shown in FIG. 3A, is superimposed on the image of the left viewpoint, then the grid points of the pixel are matched with specific points of the image of the left viewpoint. The warp map contains information representing positions of the grid points of FIG. 3A at an intermediate viewpoint in order to synthesize an intermediate view image from the image of the left viewpoint. FIG. 3B shows a variation of the pixel of FIG. 3A when the grid points of the pixel are shifted to corresponding points of the intermediate view image. The warp map contains x and y coordinate information of each grid point at the intermediate viewpoint. Since the number of grid points in the horizontal direction and the number of grip points in the vertical direction in the warp map do not correspond to the width and height of the pixel, a shift degree of each pixel can be obtained through interpolation of motion information of neighboring grid points when an actual image is warped.

Figure 4:
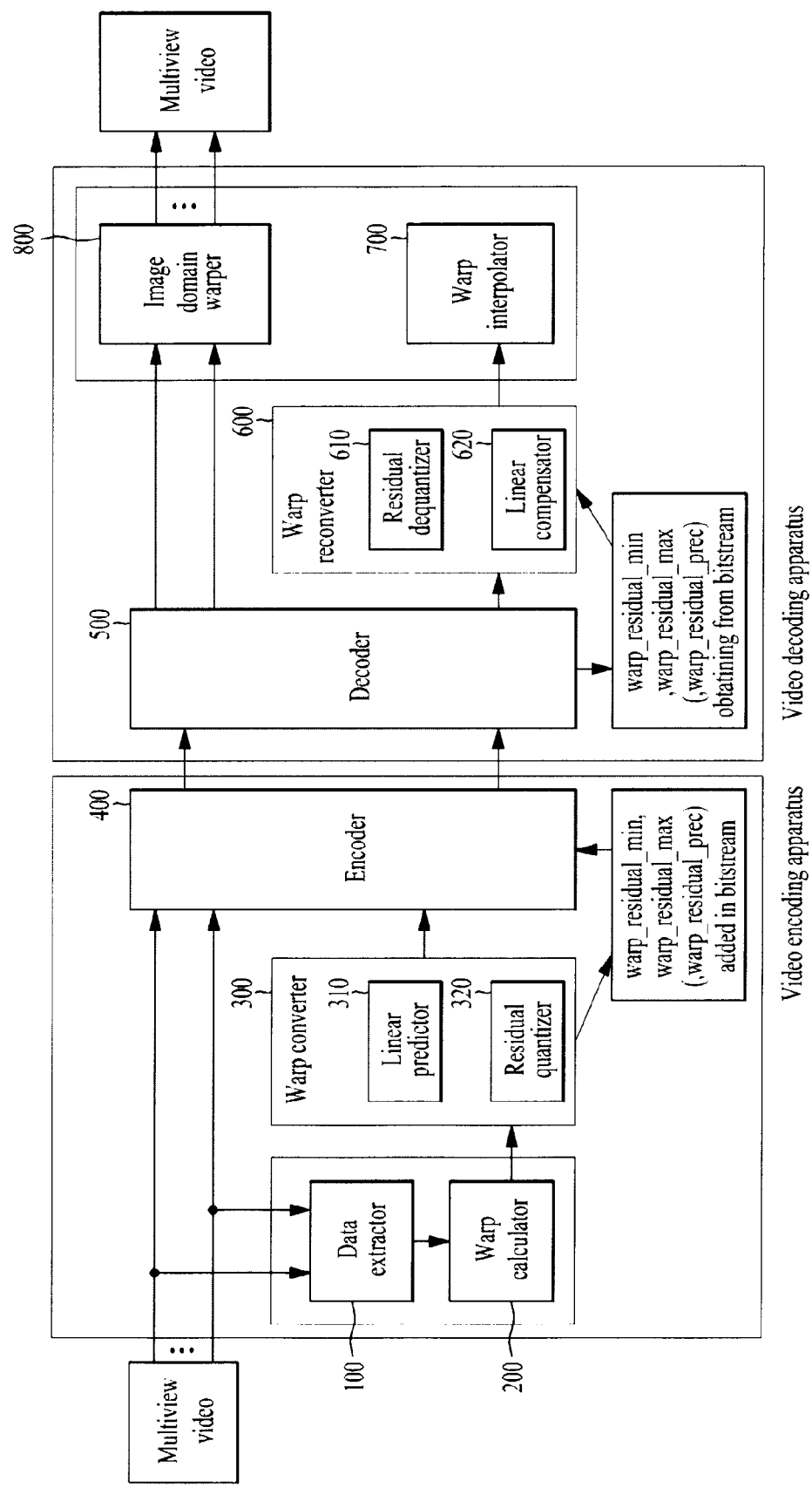
FIG. 4 illustrates an encoding apparatus including a warp converter and a decoding apparatus including a warp reconverter according to an embodiment to which the present invention is applied.

FIG. 4 illustrates a video encoding apparatus including a warp converter and a video decoding apparatus including a warp reconverter according to an embodiment to which the present invention is applied.

The video encoding apparatus may include a warp converter 300. In addition, the video encoding apparatus may further include at least one of a data extractor 100, a warp calculator 200 and an encoder 400.

In the video encoding apparatus, the encoder 400 may be a multiview video encoder. The warp map may be converted by the warp converter 300 prior to being encoded by the multiview video encoder and encoded through the same video codec as used for a multiview texture image in the multiview video encoder.

In the video decoding apparatus, a decoder 500 may be a multiview video decoder. The warp map is decoded by the multiview video decoder and then reconverted by a warp reconverter 600. The warp reconverter 600 may include a residual dequantizer 610 and a linear compensator 620.

A maximum value warp_residual_max and a minimum value warp_residual_min of the warp map correspond to a maximum value and a minimum value of residual values generated in a procedure in which the warp map is linearly predicted by the warp converter and quantized. The maximum value, minimum value and residual precision warp_residual_prec of the warp map are processed by the warp converter 300, encoded and transmitted through a bitstream. The maximum value, minimum value and residual precision warp_residual_prec will be explained in description of a quantizer.

Complexity of the warp converter 300 and the warp reconverter 600 is remarkably lower than that of a conventional additional warp encoder and decoder and the maximum value and minimum value, which need to be additionally transmitted, require an ignorable quantity of information.

The data extractor 100 extracts data for generating the warp map from the multiview texture image and sends the data to the warp calculator 200.

The warp calculator 200 generates the warp map using the data received from the data extractor 100.

The warp converter 300 converts the warp map such that the multiview video encoder can encode the warp map and includes a linear predictor 310 and a residual quantizer 320.

The linear predictor 310 included in the warp converter 300 predicts values of the warp map as linear values since the warp map has values close to linear values and transmits a residual.

The warp map indicates a position to which a pixel at the current viewpoint is shifted at a synthesized virtual viewpoint. Accordingly, a right part of an image has a larger value in the case of an x-axis warp map and a lower region of the image has a large value in the case of a y-axis map. The whole image may be represented in a form close to a one-dimensional plane.

The linear predictor 310 obtains a predicted value and a residual. The residual refers to a difference between the warp map and the predicted value. The predicted value may be a one-dimensional plane having an arbitrary gradient. The predicted value may be obtained by dividing the width of the multiview texture image by the width of the warp map, as represented by Equation 1.

Predicted value=Width of the multiview texture image/width of the warp map [Equation 1]

When only the residual is transmitted through the predicted value without using the linear predictor 310, the range of transmitted values is reduced. Coding efficiency can be improved by transmitting only the residual through the linear predictor 310.

Figure 5:
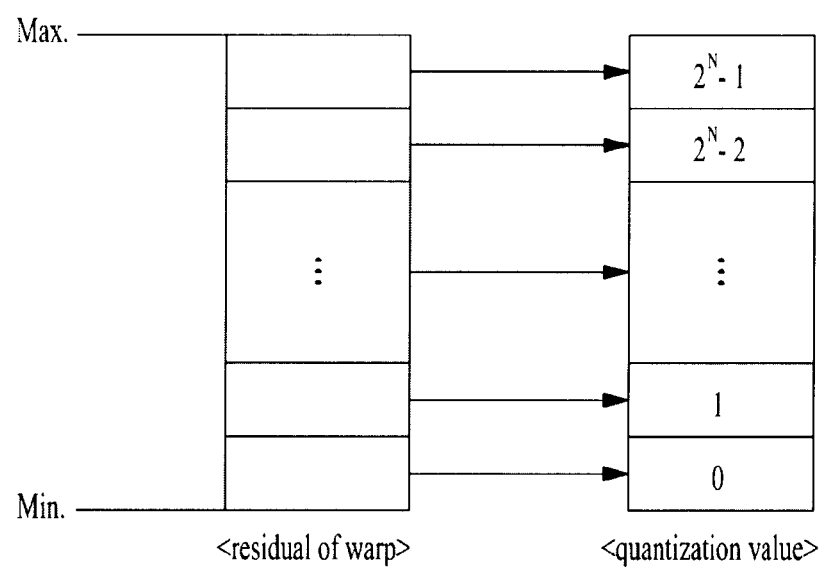
FIG. 5 illustrates the principle of a residual quantizer included in a warp converter according to an embodiment to which the present invention is applied.

FIG. 5 illustrates the principle of the residual quantizer 320 included in the warp converter 300 according to an embodiment to which the present invention is applied. When a value is input to a video codec, the value needs to be transformed into an N-bit integer through quantization. The residual quantizer 320 is a device for integer transform. The residual quantizer 320 transforms a residual value into an integer by multiplying the residual value by residual precision and rounding the resultant value.

A quantized value can be obtained by Equation 2 that represents a process of quantizing the current value CurrValue of the residual. In Equation 2, a maximum value Max refers to a maximum value from among integer values obtained by multiplying warp residual values, which correspond to differences between the predicted value generated by the linear predictor 310 and the warp map, by residual prediction and rounding off the resultant values. A minimum value Min refers to a minimum value from among integer values obtained by multiplying warp residual values by residual prediction and rounding the resultant values. The current value CurrValue refers to an integer value obtained by multiplying a residual value to be quantized through the residual quantizer 320 by the residual precision and rounding the resultant value. In Equation 2, 'round' refers to a function indicating a rounding operation.

$$QuantizedValue = \text{round}((CurrValue - \text{Min}) \times \frac{(2^N - 1)}{\text{Max} - \text{Min}}) \quad \text{[Equation 2]}$$

The residual precision is a value used to convert a residual value in the form of a real number into an integer with sufficient precision. The residual precision is obtained through 1) a method using a predetermined value in the warp converter and the warp reconverter and 2) a method of adaptively calculating residual precision according to a residual range, as represented by Equation 3, and transmitting the residual precision through a bitstream.

$$ResidualPrecision = \text{ceil}\left(\frac{2 \times (2^N - 1)}{FloatingMax - FloatingMin}\right) \quad \text{[Equation 3]}$$

In Equation 3, a floating maximum value FloatingMax and a floating minimum value FloatingMin respectively refer to a maximum value and a minimum value from among residual values before being multiplied by the residual precision. In Equation 3, ceil refers to a function indicating a carry operation.

When values multiplied by the residual precision are searched for a maximum value/minimum value with appropriate frequency and used as input of N bits/sample to the encoder, the minimum value is matched to 0, the maximum value is matched to 2N−1, other values are divided into linear sections and then quantization is performed. The warp map converted into an N-bit integer may be input to the multiview video encoder.

Methods for finding the maximum value and the minimum value may include 1) a method for finding a maximum value/minimum value of residual values on a slice basis using a slicer header and 2) a method for finding a maximum value/minimum value of residual values on a sequence basis using a sequence parameter set (SPS).

To notify the multiview video decoder of currently coded supplementary data type (depth or warp map), information indicating the data type is written on the SPS of a bitstream and transmitted. Table 1 defines this representation scheme.

TABLE 1

| Supplementary data type | Bit representation |
|---|---|
| Depth | 0 |
| Warp map | 1 |

The video decoding apparatus may include the warp reconverter 600. In addition, the video decoding apparatus may further include at least one of a decoder 500, a warp interpolator 700 and an image domain warper 800. The multiview video decoder may extract the multiview texture image and coding information for warp map prediction from a parsed bitstream. The warp reconverter 600 reconstructs the warp map using the coding information for warp map prediction, which is decoded by the multiview video decoder, and includes a residual dequantizer 610 and a linear compensator 620.

Figure 6:
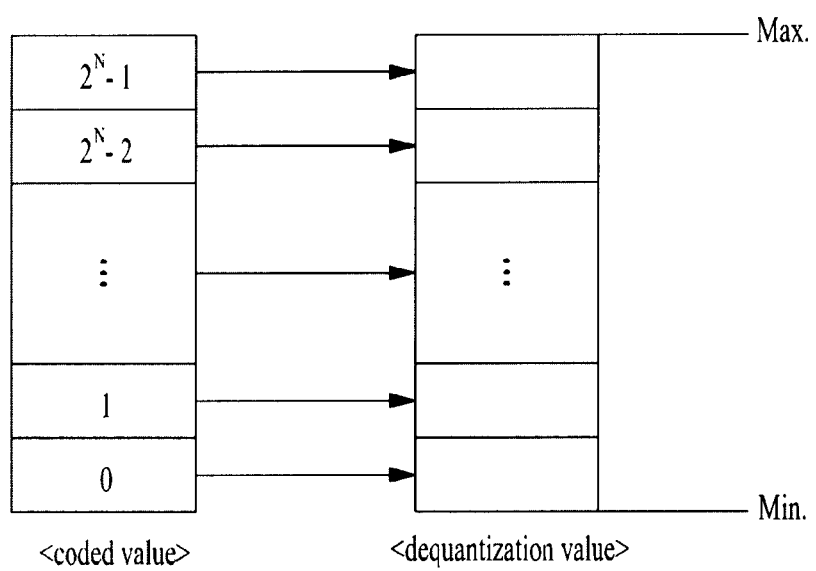
FIG. 6 illustrates the principle of a residual dequantizer included in a warp reconverter according to an embodiment to which the present invention is applied.

FIG. 6 illustrates the principle of the residual dequantizer 610 included in the warp reconverter 600 according to an embodiment to which the present invention is applied. A residual value is dequantized using a value decoded by the multiview video decoder and transmitted maximum value, minimum value and residual precision.

$$DequantizedValue = \frac{(Max - Min) \times \frac{DecodedValue}{(2^N - 1)} + Min}{ResidualPrecision} \quad \text{[Equation 4]}$$

Equation 4 represents a process of dequantizing a decoded value. In Equation 4, a maximum value and a minimum value are values transmitted through a bitstream. A dequantized value is reconstructed using the transmitted minimum value Min and maximum value Max and predetermined or transmitted residual precision.

The linear compensator 620 compensates for a value linearly predicted in the warp converter 300. The linear compensator 620 generates a predicted value like the linear predictor 310. The output of the residual dequantizer 610 and a value predicted as a linear plane by the linear compensator 620 are summed to complete warp map reconversion and the sum may be used as input of warp map synthesis. The predicted value of the linear compensator 620 may be a value obtained by dividing the width of the multiview texture image by the width of the warp map, as represented by Equation 1.

The image domain warper 800 synthesizes an intermediate view image using the decoded warp map in a receiving terminal.

The warp map can be encoded and decoded using the same video codec as used for the multiview texture image by using the warp converter 300 and the warp reconverter 600 and thus costs can be reduced since a dedicated warp map coder is not used.

Figure 7:
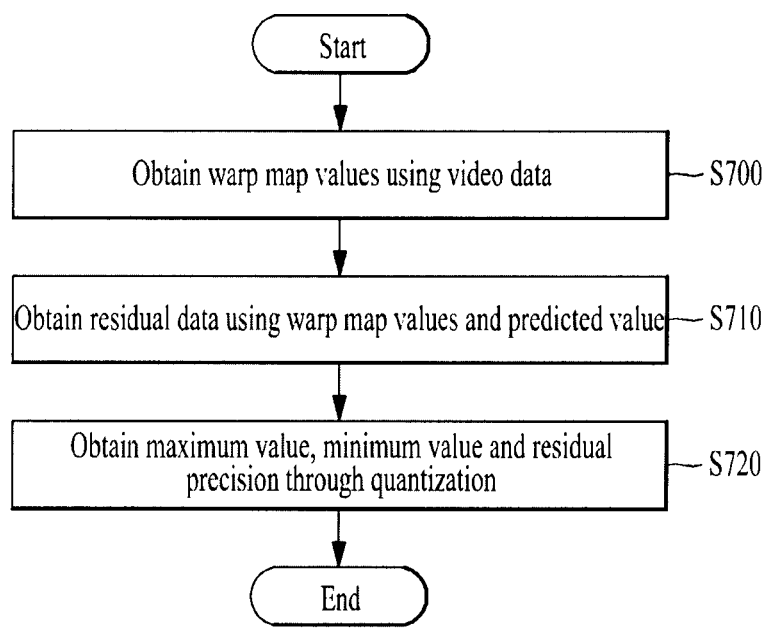
FIG. 7 is a flowchart illustrating a warp map encoding method according to an embodiment to which the present invention is applied.

FIG. 7 is a flowchart illustrating a warp map encoding method according to an embodiment to which the present invention is applied.

The warp map is obtained from the multiview texture image using the data extractor 100 and the warp calculator 200 (S700), and residual data is obtained through the linear predictor 310 included in the warp converter 300 (S710). The residual data is quantized through the residual quantizer 320 included in the warp converter 300 to obtain a maximum value, a minimum value and residual precision (S720).

Figure 8:
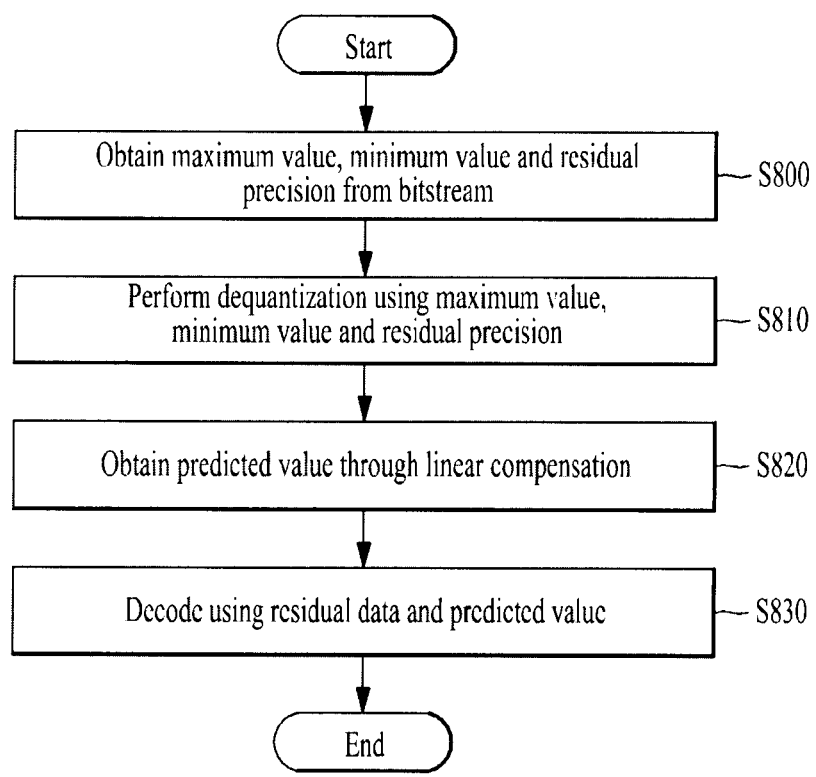
FIG. 8 is a flowchart illustrating a warp map decoding method according to an embodiment to which the present invention is applied.

FIG. 8 is a flowchart illustrating a warp map decoding method according to an embodiment to which the present invention is applied.

The maximum value, minimum value and residual precision transmitted through a bitstream are obtained (S800) and residual data is obtained through dequantization using the maximum value, minimum value and residual precision using the residual dequantizer 610 included in the warp reconverter 600 (S810). A predicted value is obtained through the linear compensator 620 included in the warp reconverter 600 (S820) and the multiview texture image is reconstructed using the predicted value and the residual data (S830).

3D video coding techniques employing the method using the warp map directly generate the warp map in a decoder to create images of new viewpoints. To achieve this, the decoder performs the aforementioned warp map generation processes. A process of extracting depth information from among the warp map generation processes requires a larger amount of computation than other processes.

Figure 9:
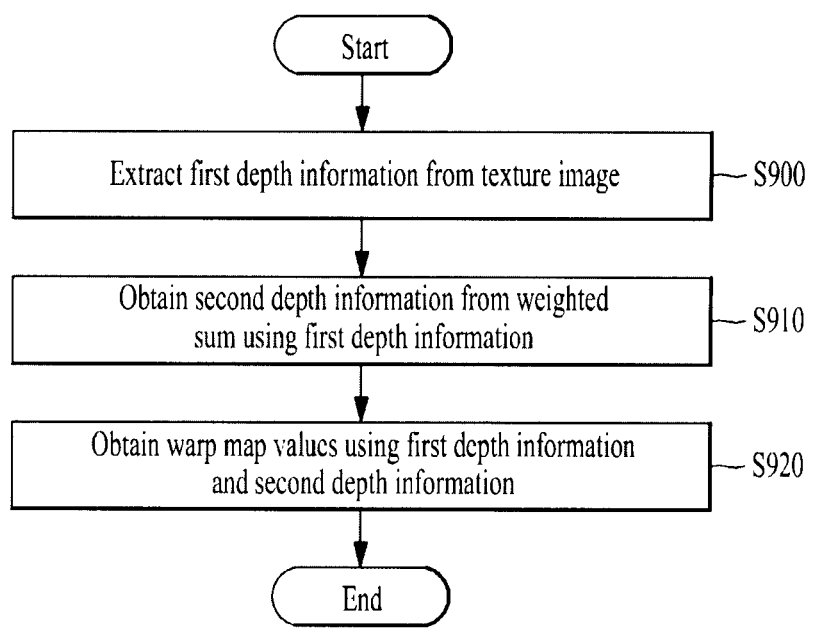
FIG. 9 is a flowchart illustrating a method for generating a warp map using a depth map in a decoder according to an embodiment to which the present invention is applied.

FIG. 9 is a flowchart illustrating a method for generating a warp map using a depth map in the decoder according to an embodiment to which the present invention is applied.

First depth information is extracted from a multiview texture image (S900). The first depth information refers to depth information extracted from the texture image. The depth information is extracted from the multiview texture image through the following procedure.

1) Multiview texture image information of each given viewpoint is analyzed to extract important pixels. Distortion of a previous view image is minimized in a pixel region having high saliency. Saliency represents a degree of markedness due to a large brightness or color difference or distinct contour in an image and can be calculated by combining edge information or depth information. A region with high saliency is less distorted. When the region with high saliency is distorted, there is a large difference between the original form of the region and the distorted form. A front region of an image may be regarded as a salient region through depth information.

2) Descriptors that represent selected pixels are extracted. Similarity among pixels can be measured through descriptors. A descriptor indicates a vector that represents characteristics of each pixel. Similarity can be defined as a geometric distance between descriptors.

3) A corresponding relationship between pixels of neighboring viewpoints is defined through similarity. A corresponding point refers to a pixel of a neighboring view image, which corresponds to a pixel of the current view image. A disparity difference between pixels can be obtained through positions of corresponding points. The disparity difference may be regarded as depth information. Accordingly, the first depth information between neighboring viewpoints is obtained.

The aforementioned method can generate an image of a new viewpoint without a depth map in all regions. However, the first depth information obtained as described above is insufficient according to characteristics of the multiview texture image in many cases. For example, when depth information of quads constituting a warp map is not equally extracted, a new view image with severe distortion is generated.

The depth information is obtained through a large amount of computations when the warp map is generated and is important information when a new viewpoint is generated. Accordingly, to perform the process of extracting depth information from a multiview texture image in the decoder causes complexity.

To solve this, a method of efficiently using depth map information such as a 3D video coding technique using a depth map is used. When depth map information transmitted from the encoder is received, depth information of all quads constituting the warp map can be secured. Furthermore, the method using a warp map can be applied to the 3D video coding technique for transmitting a depth map to improve technical compatibility.

Second depth information is obtained using the first depth information extracted from the multiview texture image (S910). The second depth information is obtained by weighted-summing the first depth information.

The depth map includes depth information of pixels that constitute an image. To generate a warp map, depth information about quads constituting the warp map is needed. To this end, depth values need to be effectively applied to the quads. For this, the following methods are described.

One quad includes multiple pixels of an image. Vertexes of quads are equally disposed in the image. The warp map includes shift information of the vertexes of the quads. Accordingly, to estimate vertex depth information of quads, depth information of neighboring pixels need to be combined.

Equation 5 defines a weighted sum of neighboring depth information of vertexes of a quad. A weight of each piece of depth information is defined as the size of the quad and a distance between vertexes of the quad. In Equation 5, Q' denotes a quad region, (i, j) denotes a pixel included in a quad, wy represents a weight applied to the pixel (i, j), |Q'|x represents the horizontal size of the quad, |Q'|y represents the vertical size of the quad, Q'x denotes the x coordinate of the center of the quad and Q'y denotes the y coordinate of the center of the quad.

[Equation 5]
$$d_{Q'} = \frac{1}{W} \sum_{(i,j) \in Q'} w_y d_y \quad W = \sum_{(i,j) \in Q'} w_y \quad w_y = \frac{1}{\sqrt{2\pi |Q'|_x |Q'|_y}} e^{-\frac{(i-Q'_x)^2 + (j-Q'_y)^2}{2|Q'|_x |Q'|_y}}$$

When depth information of the current quad is obtained by weighted summing neighboring depth information of vertexes of neighboring quads, depth information of all quads constituting the warp map can be obtained.

The warp map is obtained using the first depth information and the second depth information (S920). The multiview texture image is decoded using the warp map obtained in step S920.

Accordingly, when the new view image is generated, distortion caused by depth information insufficiency can be prevented. Furthermore, system compatibility according to presence or absence of depth map information can be increased and, simultaneously, image quality at a new viewpoint can be improved by adding the method using a warp map to a 3D video coding system employing the method using a depth map.

Figure 10:
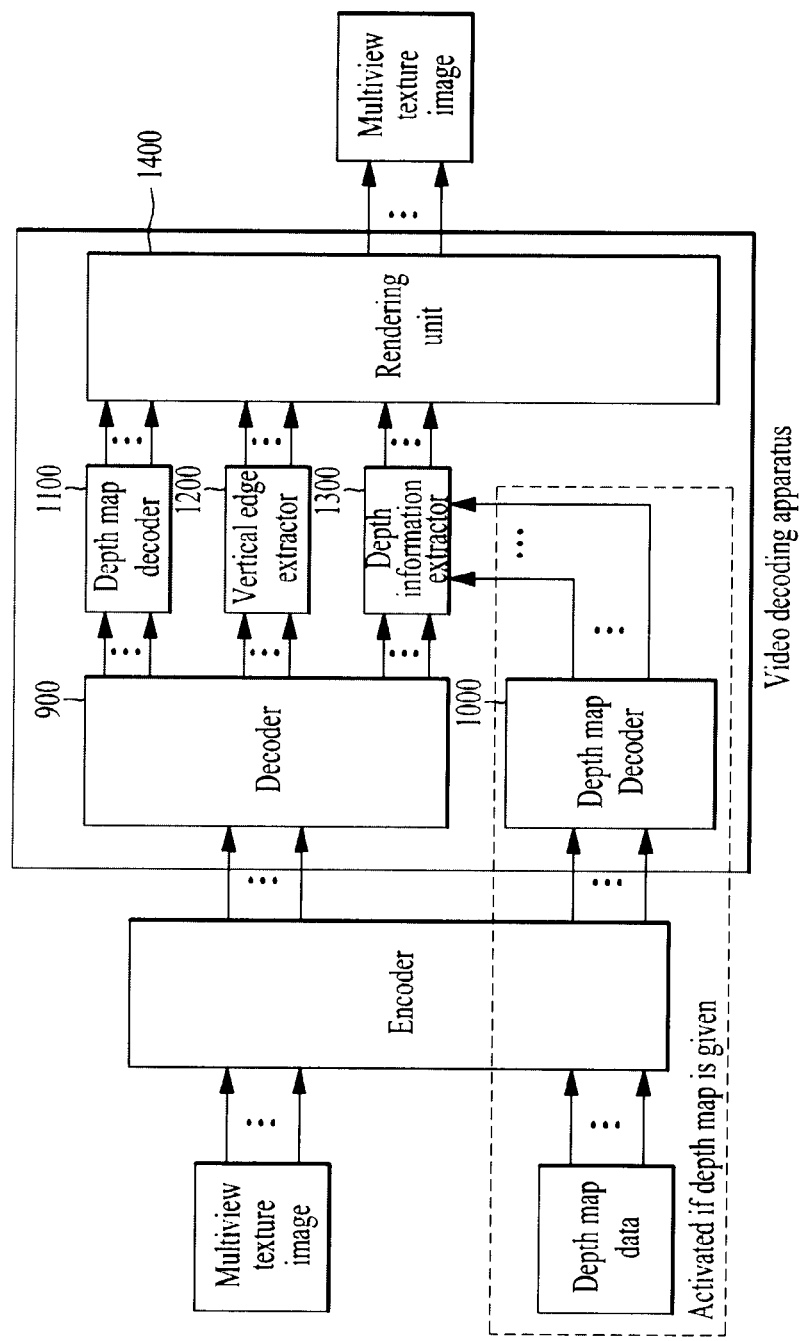
FIG. 10 illustrates a video decoding apparatus for generating a warp map in a decoder according to an embodiment to which the present invention is applied.

FIG. 10 illustrates a video decoding apparatus that generates a warp map in a decoder according to an embodiment to which the present invention is applied. A multiview texture image and depth map data are encoded through an encoder. A multiview texture image decoder 900 decodes the multiview texture image transmitted through a bitstream and a depth map decoder 1000 decodes a depth map transmitted through a bitstream. A warp map generator may include a saliency map extractor 1100, a vertical edge extractor 1200, a depth information extractor 1300 and a rendering unit 1400. The saliency map extractor 1100 extracts saliency map information representing saliency. The vertical edge extractor 1200 extracts a vertical edge of an image. The depth information extractor 1300 extracts first depth information using the decoded depth map information. The rendering unit 1400 obtains second depth information from the first depth information and generates the warp map on the basis of the extracted saliency map, vertical edge, first depth information and second depth information. The multiview texture image is reconstructed using the warp map.

As described above, the decoding/encoding apparatus to which the present invention is applied may be included in a multimedia broadcast transmitting/receiving system such as a DMB (Digital Multimedia Broadcasting) system and used to decode a video signal, a data signal and the like. In addition, the multimedia broadcast transmitting/receiving system may include a mobile communication terminal.

The decoding/encoding method to which the present invention is applied can be implemented as a program to be executed in a computer and stored in a computer readable recording medium and multimedia data having a data structure according to the present invention can be stored in the computer readable recording medium. The computer readable recording medium includes all types of storage devices storing data readable by a computer system. Examples of the computer readable recording medium include ROM, RAM, CD-ROM, magnetic tapes, floppy disks, optical data storage devices, etc. and also include implementation in the form of carrier wave (e.g. transmission over the Internet). Furthermore, a bitstream generated by the encoding method can be stored in the computer readable recording medium or transmitted through a wired/wireless communication network.

INDUSTRIAL APPLICABILITY

The present invention can be used to code a video signal.

Drawings

FIG. 1
다시점 텍스처 영상; Multiview texture image
댑스 맵 정보; Depth map information
인코더; Encoder
디코더; Decoder
댑스 이미지 렌더링; Depth image rendering
다시점 텍스처 영상; Multiview texture image
FIG. 2
다시점 텍스처 영상; Multiview texture image
데이터 추출기; Data extractor
와프 연산기; Warp calculator 인코더; Encoder
와프 인코더; Warp encoder
디코더; Decoder
와프 디코더; Warp decoder
이미지 도메인 와핑; Image domain warper
와프 보간기; Warp interpolator
다시점 영상; Multiview video
FIG. 4
다시점 영상; Multiview video
비디오 인코딩 장치; Video encoding apparatus
비디오 디코딩 장치; Video decoding apparatus
100 Data extractor
200 Warp calculator
300 Warp converter
310 Linear predictor
320 Residual quantizer
400 Encoder
Add to warp_residual_min, warp_residual_max, (warp_residual_prec) bitstream
500 Decoder
600 Warp reconverter
610 Residual dequantizer
620 Linear compensator
700 Warp interpolator
800 Image domain warper
FIG. 7
Start
S700 Obtain warp map values using video data
S710 Obtain residual data using warp map values and predicted value
S720 Obtain maximum value, minimum value and residual precision through quantization
End
FIG. 8
Start
S800 Obtain maximum value, minimum value and residual precision from bitstream
S810 Perform dequantization using maximum value, minimum value and residual precision
S820 Obtain predicted value through linear compensation
S830 Decode using residual data and predicted value
End
FIG. 9
Start
S900 Extract first depth information from texture image
S910 Obtain second depth information from weighted sum using first depth information
S920 Obtain warp map values using first depth information and second depth information
End
FIG. 10
비디오 디코딩 장치; Video decoding apparatus
다시점 텍스처 이미지; Multiview texture image
뎁스 맵 데이터; Depth map data
인코더; Encoder
900 Decoder
1000 Depth map decoder
1100 Saliency map extractor
1200 Vertical edge extractor
1300 Depth information extractor
1400 Rendering unit

The invention claimed is:

1. A video encoding apparatus, comprising:
a warp calculator for generating a warp map from a multiview texture image comprising a plurality of pixels;
a warp converter for converting the warp map into a warp residual; and
a multiview video encoder for encoding the multiview texture image and the warp residual,
wherein the warp map indicates coordinate information corresponding to each pixel of the plurality of pixels of the multiview texture image,
wherein the warp calculator generates shift information using depth information which is extracted from the multiview texture image, estimates saliency map information using the depth information, extracts a vertical edge region from the multiview texture image, and generates the warp map using the shift information, the saliency map information and the vertical edge region,
wherein the shift information indicates a degree by which the each pixel of the plurality of pixels of the multiview texture image is shifted,
wherein the saliency map information indicates a degree of distinctness in the multiview texture image,
wherein the vertical edge region indicates a vertical component of a foreground or background in the multiview texture image.

2. The video encoding apparatus according to claim 1, wherein the warp converter further comprises a linear predictor for generating a predicted value using the width of the multiview texture image and the width of the warp map and generating the warp residual using the warp map and the predicted value.

3. The video encoding apparatus according to claim 1, wherein the warp residual includes at least one of a maximum value, a minimum value and a residual precision,
wherein the warp converter further comprises a residual quantizer for converting the warp residual into an integer using at least one of the maximum value, the minimum value and the residual precision.

4. A video decoding apparatus, comprising:
a multiview video decoder for receiving a bitstream including a warp residual and a multiview texture image comprising a plurality of pixels; p1 a warp reconverter for reconstructing a warp map using the warp residual including at least one of a maximum value, a minimum value, and a residual precision; and
an image domain warper for generating a multiview video using the multiview texture image and the warp map,
wherein the warp map indicates coordinate information corresponding to each pixel of the plurality of pixels of the multiview texture image,
wherein the warp reconverter includes a liner compensator and a residual dequantizer,
wherein liner compensator generates a predicted value using a width of the multiview text image and a width of the warp map,
wherein the residual dequantizer dequantizes the warp residual using at least one of the maximum value, the minimum value, and the residual precision, to obtain a dequantized wrap residual,
wherein the wrap reconverter reconstructs the warp map using the dequantized warp residual and the predicted value.

5. The video decoding apparatus according to claim 4, wherein the multiview video decoder receives supplementary data type whether supplementary data in the bitstream is depth type or warp map type.

6. The video decoding apparatus according to claim 4, wherein the maximum value and the minimum value are obtained from a slice header.

7. The video decoding apparatus according to claim 4, wherein the maximum value and the minimum value are obtained from a sequence.

8. The video decoding apparatus according to claim 4, wherein the residual precision is obtained using a floating maximum value and a floating minimum value.

* * * * *